(12) United States Patent
Layne et al.

(10) Patent No.: US 9,650,211 B1
(45) Date of Patent: May 16, 2017

(54) CONVEYOR WITH ENHANCED CLEANING CAPABILITY

(75) Inventors: James L. Layne, Bowling Green, KY (US); Lewis W. Ward, Glasgow, KY (US); Scott Dayton Barbour, Glasgow, KY (US)

(73) Assignee: SPAN TECH LLC, Glasgow, KY (US)

( * ) Notice: Subject to any disclaimer, the term of this patent is extended or adjusted under 35 U.S.C. 154(b) by 1201 days.

(21) Appl. No.: 13/362,596

(22) Filed: Jan. 31, 2012

Related U.S. Application Data

(60) Provisional application No. 61/437,808, filed on Jan. 31, 2011.

(51) Int. Cl.
*B65G 45/00* (2006.01)
*B65G 45/10* (2006.01)

(52) U.S. Cl.
CPC .................... *B65G 45/10* (2013.01)

(58) Field of Classification Search
CPC .................... B65G 45/10; A61L 2/03–2/12
USPC .................. 198/493, 494; 250/455.11, 492.1
See application file for complete search history.

(56) References Cited

U.S. PATENT DOCUMENTS

| | | | |
|---|---|---|---|
| 1,737,823 A * | 12/1929 | Bodle | B65G 39/20 198/851 |
| 2,681,137 A | 6/1954 | Davis | |
| 2,839,651 A | 6/1958 | Erickson | |
| 3,580,164 A | 5/1971 | Baker | |
| 3,772,481 A | 11/1973 | Saponaro | |
| 3,830,196 A | 8/1974 | Guttman et al. | |
| 3,870,141 A * | 3/1975 | Lapeyre | B65G 17/08 198/853 |
| 3,883,386 A | 5/1975 | Garbini et al. | |
| 4,069,790 A | 1/1978 | Witte | |
| 4,182,444 A | 1/1980 | Fisher | |
| 4,927,003 A | 5/1990 | Swinderman et al. | |
| 5,014,844 A | 5/1991 | Anttonen | |
| 5,024,319 A * | 6/1991 | Dixon et al. | 198/494 |
| 5,070,997 A | 12/1991 | Lanham et al. | |
| 5,091,152 A * | 2/1992 | Thomas, Sr. | A61L 2/02 204/228.6 |
| 5,617,800 A | 4/1997 | Moreschi et al. | |
| 5,865,293 A * | 2/1999 | Napadow | B65G 45/22 198/495 |
| 6,125,991 A * | 10/2000 | Veldkamp | A22C 15/001 198/678.1 |
| 6,581,755 B1 | 6/2003 | Wilke et al. | |
| 6,790,484 B2 | 9/2004 | Mann | |
| 6,994,204 B2 * | 2/2006 | Buescher et al. | 198/335 |
| 7,234,586 B1 * | 6/2007 | Newman | 198/495 |
| 7,323,666 B2 | 1/2008 | Spohn et al. | |
| 7,540,373 B2 | 6/2009 | Heim et al. | |

(Continued)

OTHER PUBLICATIONS

R. Zvitov.C. Zohar-Perez and A. Nussinovitch http://aem.asm.org/content/70/6/3781.full.pdf+html Appl. Environ. Microbiol. Jun. 2004 vol. 70 No. 6 3781-3784.

(Continued)

*Primary Examiner* — William R Harp
(74) *Attorney, Agent, or Firm* — King & Schickli, PLLC

(57) ABSTRACT

An apparatus for use with a conveyor for conveying objects and including an exposed surface. A source of energy is provided to transmit energy to at least a portion of the exposed surface. The energy should be at a level sufficient to kill a living organism in contact with the exposed surface.

28 Claims, 6 Drawing Sheets

(56) References Cited

U.S. PATENT DOCUMENTS

| | | |
|---|---|---|
| 7,745,355 B2 | 6/2010 | Spohn et al. |
| 7,828,136 B2 | 11/2010 | Damkjaer |
| 8,066,508 B2 | 11/2011 | Nordberg |
| 8,297,435 B2 * | 10/2012 | Lathem ......................... 198/617 |
| 8,361,285 B2 | 1/2013 | Krone |
| 8,590,361 B1 | 11/2013 | Feller |
| 8,624,203 B2 * | 1/2014 | Tullo et al. ................ 250/492.1 |
| 8,937,822 B2 | 1/2015 | Dent |
| 2006/0249358 A1 * | 11/2006 | Hartman et al. ............. 198/850 |
| 2014/0306023 A1 | 10/2014 | Joppen |

OTHER PUBLICATIONS

"Short-Duralion Low-Direct-Current Electrical Field Treatment is a Practical Tool for Considerably Reducing Counts of Gram-Negative Bacteria Entrapped in Gel Beads".

\* cited by examiner

CONVEYOR WITH ENHANCED CLEANING CAPABILITY

This application claims the benefit of U.S. Provisional Patent App. Ser. No. 61/437,808 filed Jan. 31, 2011, the disclosure of which is incorporated herein by reference.

FIELD OF THE INVENTION

This disclosure relates generally to the conveyor arts and, more particularly, to a manner of enhancing the cleanliness of a conveyor.

BACKGROUND OF THE INVENTION

A popular application of conveyors is for the conveyance of consumer products, including food and other biologically active articles. Invariably, such products contact the conveying surface and may shed debris that becomes trapped in nooks or crevasses, leading to unsanitary conditions. This can be a particular issue in conveyors comprised of modular links interconnected by a connector, such as a rod, given the requirement for apertures or pockets in the links for receiving the connector.

In the past, many others have proposed the use of external devices that use cleaning fluids for washing a conveyor to enhance its cleanliness, but with limited success given the pockets and recessed areas on a typical conveyor in which bacteria and the like may become lodged and proliferate. Still others have proposed the inclusion of anti-microbial agents into the materials used to form the conveyor chain, but at a relatively high cost and again with limited success.

Accordingly, a need exists for an improved manner of enhancing the cleanliness of a conveyor. The arrangement should be readily adaptable to different types of conveyors at minimal cost, and potentially applied in a retrofit situation without extensive effort.

SUMMARY OF THE INVENTION

In one aspect of the disclosure, an apparatus for handling objects comprises a conveyor for conveying the objects, said conveyor including a plurality of modular links interconnected by a connector including an exposed surface. An energy source is provided for transmitting energy to the exposed surface at a level sufficient to kill a living organism in contact with the exposed surface.

The source of energy may comprise a source of electrical energy and, preferably, a source of direct current. In either case, the source may form a circuit with the connector, which may comprise a metal rod (in which case, an electrified connector is formed). A retainer may be provided for retaining the connector in place relative to the links, and wherein the retainer forms a part of the circuit with the connector. Alternatively, the source of energy may comprise a thermal source, such as a heater and, preferably, an inductive heater. The connector may also comprise a polymer.

Another aspect of the disclosure pertains to a conveyor system, comprising an endless loop conveyor having a forward run and a return run, and a heater positioned along only the return run of the conveyor. Preferably, the heater is a first heater positioned adjacent a conveying surface of the conveyor, and further including a second heater positioned adjacent a surface of the conveyor opposite the conveying surface. Most preferably, the conveyor comprises a plurality of links interconnected by at least one connector capable of conducting heat, such one formed of a metal or polymer material, and the heater comprises an inductive coil.

Still a further aspect of the disclosure is an apparatus for conveying objects. The apparatus comprises an endless loop conveyor comprising a plurality of links forming a conveying surface adapted for conveying the objects, said links interconnected by an at least partially exposed connector rod. A first heater is positioned opposite the conveying surface, and a second heater may be positioned adjacent the conveying surface. Preferably, the first and second heaters sandwich a return run of the conveyor, but may alternatively be staggered in the conveying direction.

Yet another aspect of the disclosure pertains to an apparatus for conveying objects, comprising: a conveyor formed of a plurality of modular links interconnected by a connector formed of a conductive material, at least one portion of said connector being covered by at least one of said modular links; and a source of energy positioned adjacent or in contact with the conveyor for transmitting the energy to a portion of the connector not covered by the at least one modular link in an amount sufficient to kill a living organism in contact with the connector. Preferably, the source of energy comprises a source of electricity and, most preferably, a source of direct current. Alternatively, the source of energy may comprise a heater.

Other aspects of the disclosure pertain to methods, such as a method of operating a conveyor, comprising supplying energy from a source of energy in a heightened amount sufficient to kill a living organism in contact with the conveyor. The supplying step may comprise supplying electrical energy to the conveyor, such as by passing current through a circuit including a part of the conveyor (e.g., a connector rod for interconnecting a plurality of modular links forming a portion of the conveyor). Alternatively, the supplying step may comprise applying heat to a return run of the conveyor, while allowing for the conveying a food product on a forward run of the conveyor.

Another method is a method of cleaning a conveyor by heating an exposed surface of a conveyor in a heightened amount sufficient to kill a living organism in contact with the exposed surface.

BRIEF DESCRIPTION OF THE DRAWING FIGURES

Figures 4A, 4B, 4C:
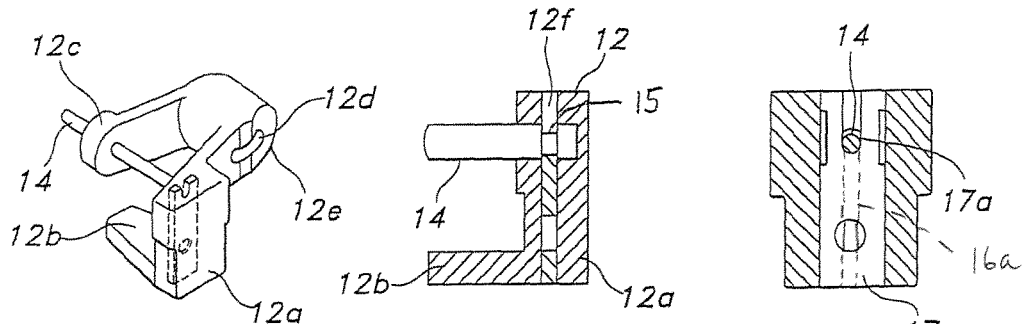
Figure 5:
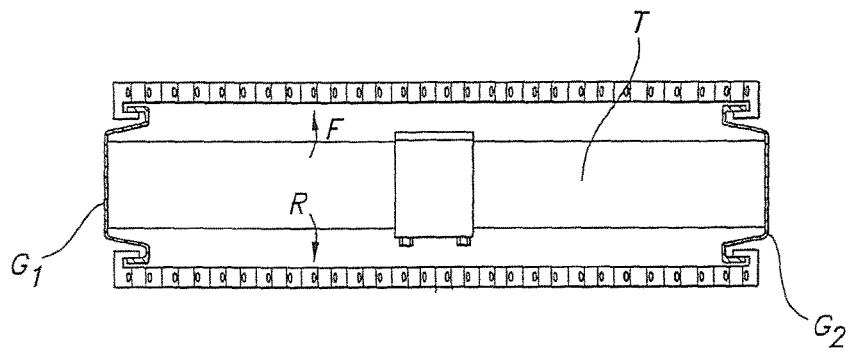
Figure 6:
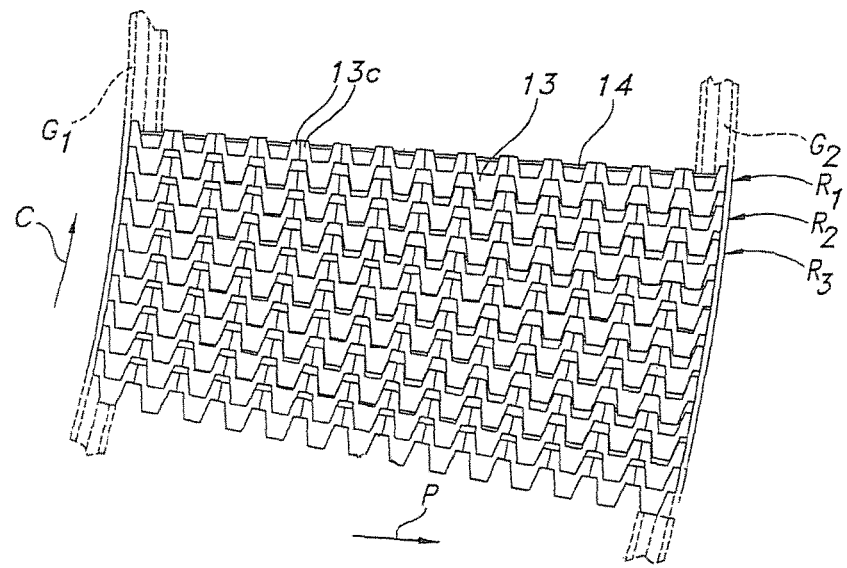
Figure 7:
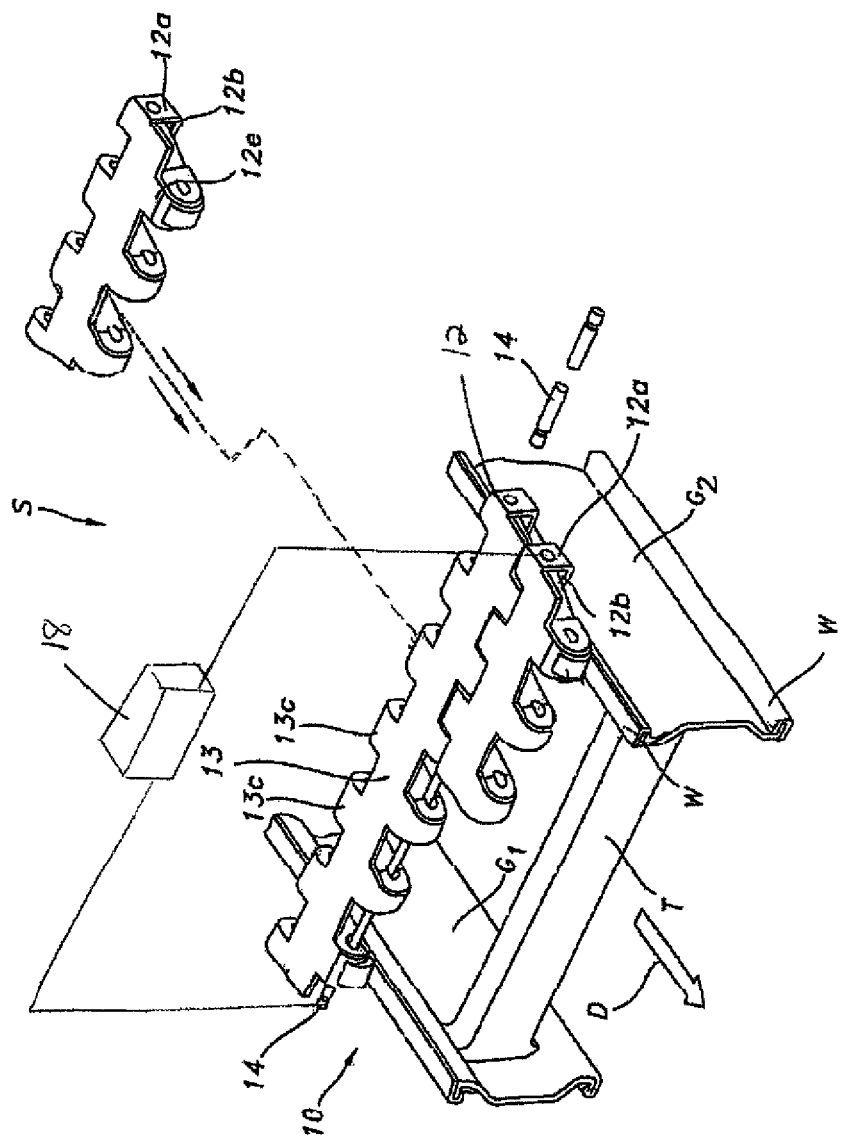
Figure 8:
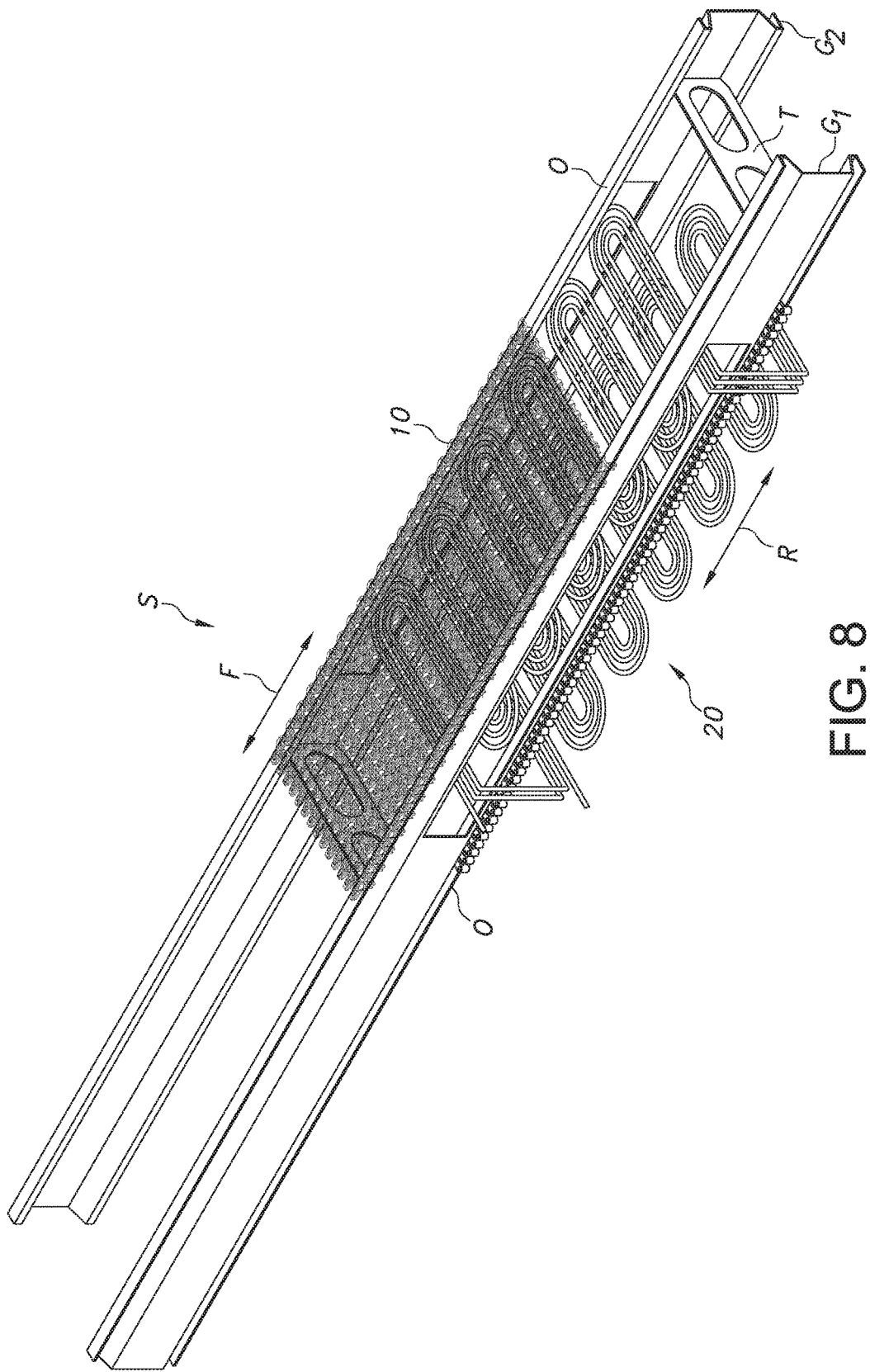
Figure 9:
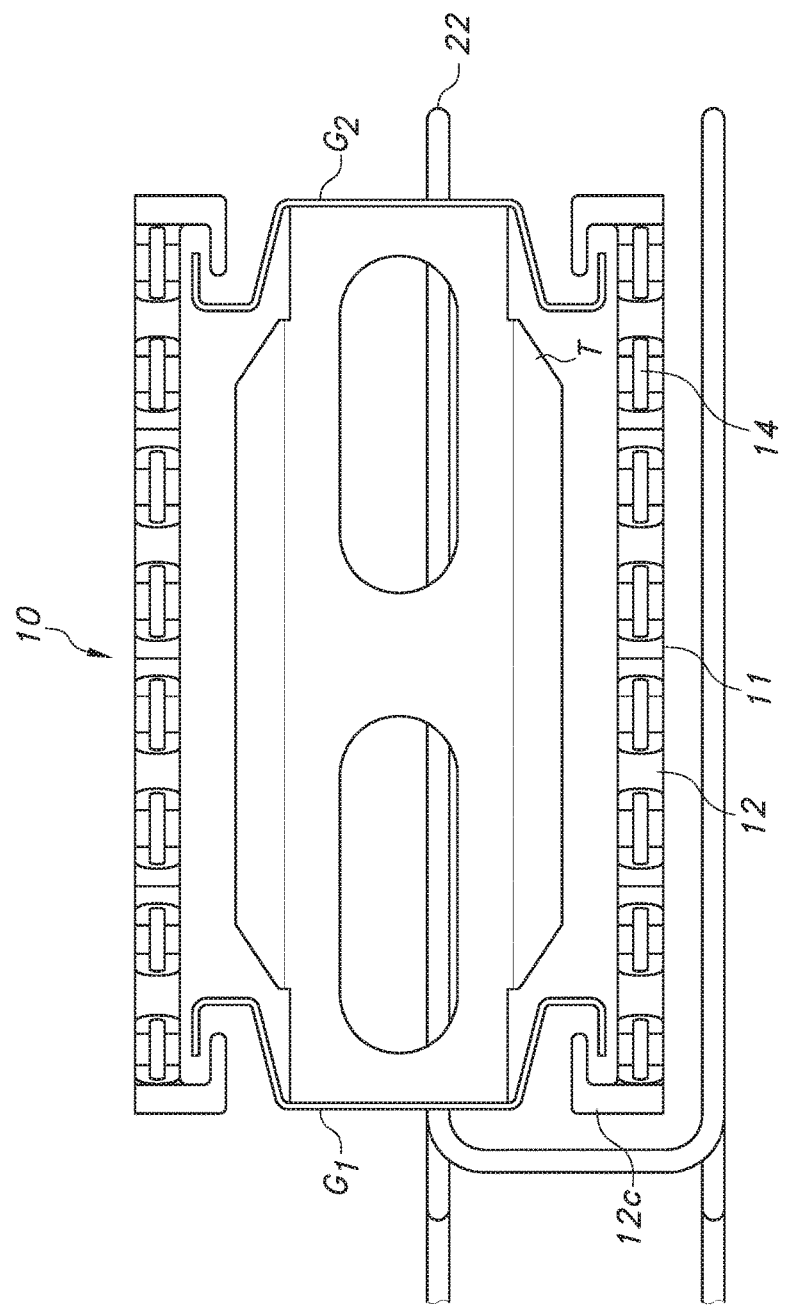

FIGS. 4a, 4b, and 4c present various views of a possible side link construction;

FIG. 5 illustrates an end view of the modular link conveyor showing the upper and lower runs;

FIG. 6 is a top view showing the manner in which a modular link conveyor may side-flex in order to traverse bends;

FIG. 7 is a perspective, partially exploded view showing one manner of providing energy to a conveyor in an amount sufficient to kill an organism in contact with the conveyor;

FIG. 8 is a perspective view of another manner of providing energy to a conveyor in an amount sufficient to kill an organism in contact with the conveyor;

FIG. 9 is a cross-sectional end view of the conveyor of FIG. 8; and

Figure 10:
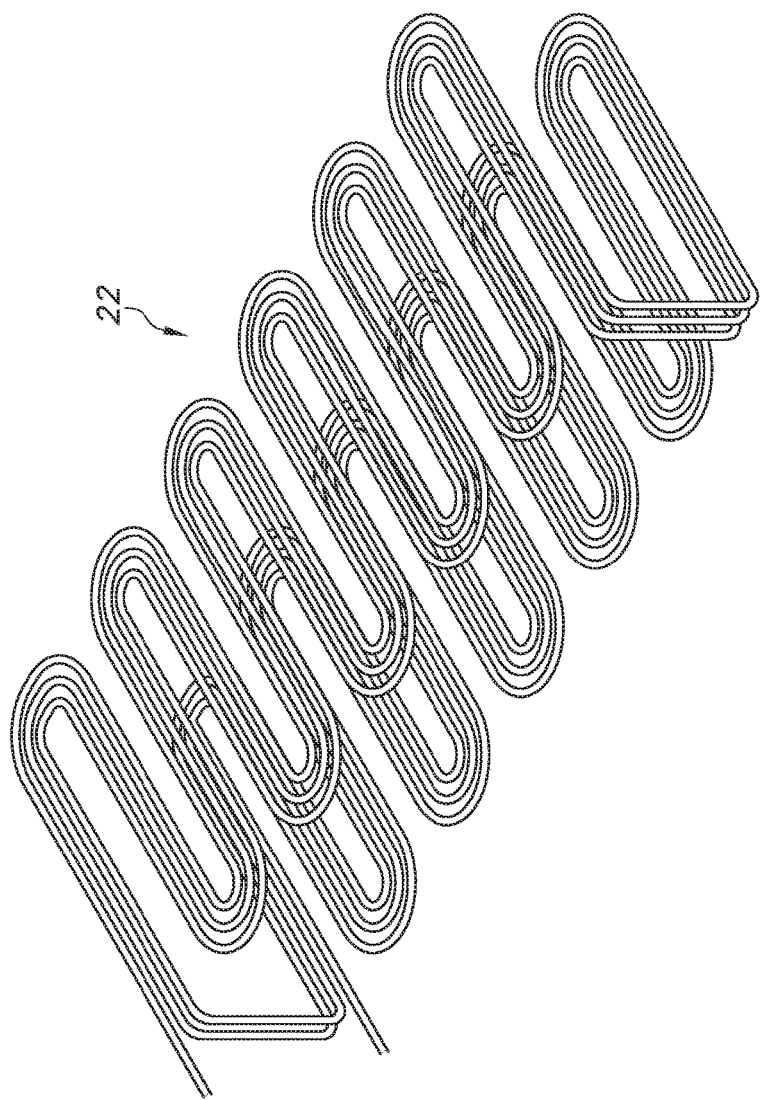

FIG. 10 is a view of the source of energy used in the embodiment of FIG. 8.

DETAILED DESCRIPTION OF THE INVENTION

Reference is now made to FIGS. 1-6, which depict one embodiment of a conveyor system S that may benefit from enhanced cleaning capabilities. In the illustrated embodiment, the conveyor system S comprises a conveyor including a belt or chain 10. The chain 10 includes a conveying surface 11 for engaging and supporting articles, such as food products. In this particular embodiment, the chain 10 comprises or includes modular links. Preferably, but not exclusively, the links include side guide links 12 and intermediate links 13 arranged in spaced apart rows (see FIG. 6 and note rows $R_1 \ldots R_n$), which thus partially create the conveying surface 11. Adjacent rows $R_1$, $R_2$ of links 12, 13 are interconnected by transversely extending connectors 14, which are also referred to in the vernacular as "cross rods," "hinge pins," etc. These cross rods or connectors 14 are partially obscured by the links 12, 13, but remain partially exposed or uncovered by the links as well, and thus susceptible to contacting or being coated by detritus (e.g., food debris, bacteria, etc.).

With regard to the optional side links 12, and as perhaps best understood by viewing FIGS. 3 and 4a-4c, each may include an outer depending arm 12a and an inwardly projecting or extending transverse tab 12b (thus creating different right handed or left handed side links, depending on the particular positioning). When present, the depending arm 12a and transverse tab 12b are designed to receive a conventional support structure, which may include a longitudinally extending guide rail $G_1$ or $G_2$ forming part of the conveyor support frame. These guide rails $G_1$, $G_2$ support the chain 10 along both the forward run F and the return run R as it is bidirectionally driven in an endless path (such as by spaced sprockets K adapted for engaging the links along a transition from a forward run F to a return run R and gang-driven by an associated motor M, which provides kinetic energy but is not the source of energy contemplated for providing enhanced cleaning of the conveyor chain 10).

Figure 1:
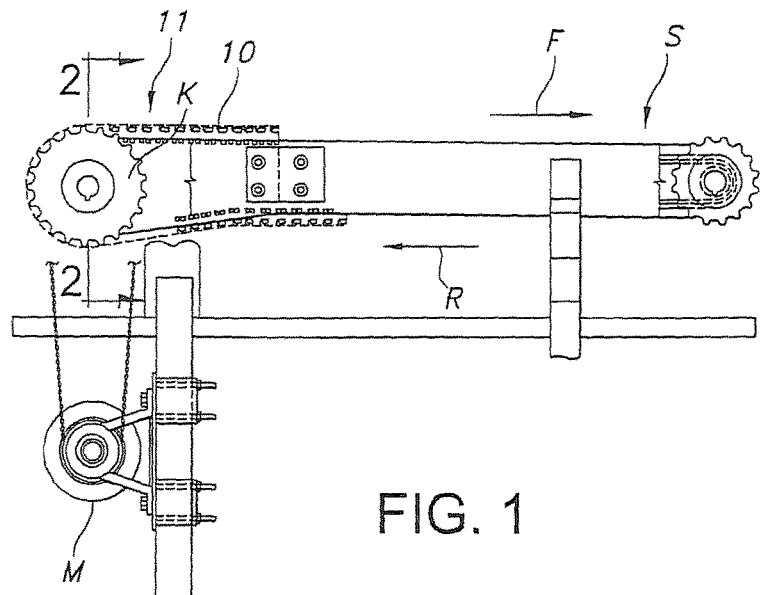
FIG. 1 is a side schematic view of one example of an endless, modular link conveyor.
Figure 2:
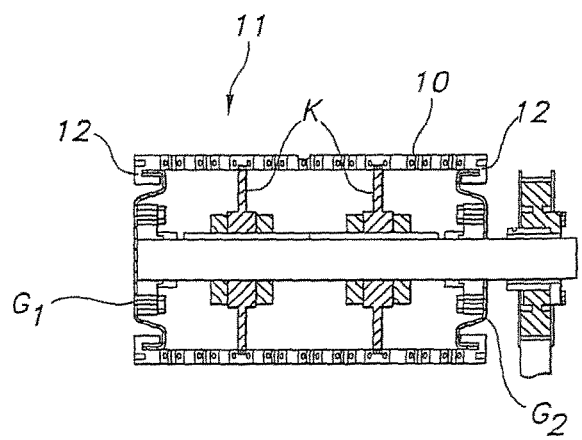
FIG. 2 is a cross-sectional view taken along line 2-2 in FIG. 1.
Figure 3:
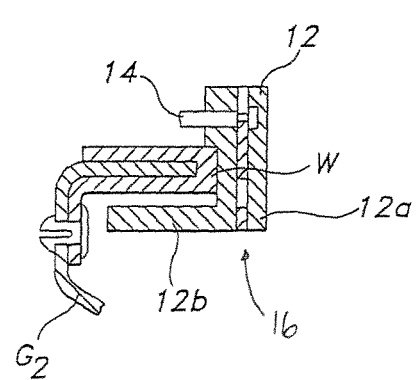
FIG. 3 is a partially cutaway cross-sectional view illustrating an exemplary support arrangement for a conveyor.

Each guide rail $G_1$ or $G_2$ preferably includes a wear strip W formed of a tribologically enhanced material to provide reduced friction contact with the links 12. The guide rails $G_1$ or $G_2$ may be C-shaped or sigma shaped, as shown in FIGS. 2 and 5, or instead may simply include one or more support sections of any desired shape carrying the associated wear strips W such that they project outwardly therefrom like a tongue or tenon and thus define a bearing surface for the chain 10 (and, in particular, the side guide links 12). Associated links of the sort mentioned are typically formed of complementary or matched materials, such as acetal or other inexpensive, lightweight, and durable materials using well-known forming techniques (including possibly co-molding of different materials). Although performance of the system 10 may be improved as a result, matching of the materials forming the links and guide rails (wear strips) is not considered a requirement.

Preferably, pairs of side links 12 together with intermediate links 13 form rows spaced apart in the direction in which the chain 10 is typically driven (referred to as the longitudinal direction or the conveying direction (note action arrow C in the plan view of FIG. 6)), since it corresponds to the main direction in which articles are conveyed by the chain 10 during normal operation, as opposed to the transverse or lateral direction P). To interconnect the pairs of links 12 forming a first (leading) row $R_1$, the transverse connector 14 takes the form of a stainless steel rod passing through aligned holes (see FIG. 6) formed in foot portions 13c of each intermediate link 13 (which may be more than two in cases where each link has plural laterally repeating sections), including the side link 12. During construction of the chain 10, the links 12, 13 of a second, adjacent (trailing) row $R_2$ interdigitate with those of the first row $R_1$, with the connector 14 passing through a slot 12d elongated in the conveying direction D and formed in the apex 12e of each link 12, 13 in the second row (and thereby forming a section of the chain 10).

As should be appreciated by those of skill in the art, this specific structural arrangement (which is considered entirely optional) allows for the chain 10 to side-flex to negotiate curves or bends (see FIG. 6), as well as to compress or expand in the longitudinal direction, and thus eliminates the need for a catenary. If such enhanced functionality is not necessary for a particular application, the slots 12e could simply be replaced with plain holes for receiving the connector 14, which would this result in a non-side flexing, non-longitudinally compressible chain.

The connector 14 may be retained in place by a retainer 16. In the illustrated embodiment, the retainer 16 is in the form of a tab 17 removably inserted in a receiver 12f or slot formed in each side link 12. As shown in FIG. 4b, the tab 17 may include a recess 17a for engaging a notched or recessed portion 15 of the connector 14. This pattern of assembly may be repeated among the interdigitated links 12, 13 as necessary to form a chain 10 having a particular length in the conveying direction.

With reference to FIG. 7, one aspect of the disclosure relates to forming the connector 14 of a conductive material and providing it with energy in an amount sufficient to kill or otherwise permanently incapacitate one or more adjacent living organisms (e.g., uni-cellular bacteria or the like) that may be harmful to human beings, such as if consumed or ingested. In one embodiment, this may be achieved by providing a flow of electrical energy through the connector 14, such as by arranging a positive lead of a source 18 of direct current on one end, and the negative lead on the other (which source may be integral with or separate from the chain 10). The resulting flow of energy passes through the circuit thus formed and ultimately to the surfaces of the connector 14 (including those normally covered in use by the material of the links 12, 13 and recessed in pockets, blind holes, or the like). The energy preferably is at a level necessary to kill any living organisms in contact with the surface, which is estimated to be a constant voltage ranging from about 2 to about 30 V (see, e.g., R. Zvitov, C. Zohar-Perez and A. Nussinovitch, "*Short-Duration Low-Direct-Current Electrical Field Treatment Is a Practical Tool for Considerably Reducing Counts of Gram-Negative Bacteria Entrapped in Gel Beads, Appl. Environ. Microbiol.,* 70(6):3781 (2004), which is incorporated herein by reference), or at an amount sufficient to produce a current density from about 15 $\mu A/cm^2$ to about 10 $mA/cm^2$ or higher, depending on the time of application (with more current resulting in a shorted application time) and the type of bacteria or organism. The result is a conveyor chain 10 and resulting conveyor system S that enjoys enhanced self-cleaning capabilities based on the application of electrical energy.

In another embodiment, the electrical charge is provided to the connector 14 via an associated structure. For example, the connection to the corresponding source of power may be made by way of one or both of the retainers 16 for retaining the connector 14 in place. As should be appreciated, the retainer 16 in such case would also be made of a conductive material, and should be designed to form a sufficiently intimate contact so as to conduct electricity. It is also of course possible, as shown in FIG. 4a, to make a portion 16a of the retainer 16 electrically conductive (e.g., of metal), while the remainder is formed of a resilient material (e.g., a polymer) to grasp the connector.

Referring now to FIGS. 8-10, another approach is to apply energy in the form of heat to enhance the cleanliness of the conveyor. This may be accomplished by passing the chain 10 adjacent to at least one heater connected to the conveyor system S, such as for example by being supported by the guide rails $G_1$ or $G_2$ for guiding the conveyor chain 10. Preferably, the arrangement is such that a passive heater is used, such as an inductive heater 20. In the illustrated embodiment, this heater 20 comprises an inductive coil 22 adapted to be connected to a power supply (not shown).

Preferably, this coil 22 is strategically positioned along the return run R adjacent the bottom-facing conveying surface 11 and the opposed (normally underside) surface, respectively (and thus may be considered to form first and second spaced heaters that sandwich the chain 10). For example, as shown in FIGS. 9 and 10, the coil 22 may comprise a unitary structure arranged to extend both above and below the return run of the conveyor chain 10. To achieve this result, the coil 22 may pass through openings O formed in the guide rails $G_1$, $G_2$, preferably away from any transverse support structure T.

The heater 22 when operational may induce heating in an amount sufficient to contact and disable or kill any living organisms on the chain 10, including by heating the exposed connectors 14 to allow the heat to penetrate into the holes, apertures, or other blind areas that are normally difficult to clean using external washers using fluids. This helps to ensure that even hidden organisms are killed by the transmitted energy in an efficient manner. To ensure the desired result is achieved, the conveying speed of the chain 10 could be slowed or stopped, if necessary, during a cleaning cycle. In any case, the goal is to ensure that the amount of heat transmitted warms the connectors to a suitable temperature (i.e., at least 180° F. or greater) in order to kill some or all of the organisms in contact therewith, and perhaps in surrounding areas as well. Although not believed to be necessary to achieve an acceptable level of sanitation for many applications, a conventional washer using fluids may also be provided downstream to facilitate the cleaning operation.

As noted above, it is it also preferable that the connector 14 be formed of a conductive material capable of rapidly transmitting the energy, especially to portions that would otherwise be covered by the material of the links or otherwise. Although solid metals are of course excellent conductors, it is also possible to use polymeric materials that are capable of conducting heat or electricity. Furthermore, it is possible to use polymer materials with embedded conductors (screens, powders, or the like), which may be formed by various processing techniques (including co-extrusion), to improve the heat transfer.

EXAMPLE

An experiment was conducted in which a single position 6-turn helical coil was used to generate the required heating in a section of conveyor comprised of plastic modular links arranged in rows interconnected by 3/16" steel rods. The conveyor section was placed within the coil, and an AMERITHERM EKOHEAT 10 c/100, 10 KW, 50 KHz-150 KHz solid state induction power supply was used to cause inductive heating in the coil. At a frequency of 105 KHz, the steel connector rods of the conveyor reached 300 degrees Fahrenheit within about 2 minutes, and remained above that temperature for some time after the inductive heating ceased.

The foregoing descriptions of various embodiments provide illustration of the inventive concepts. The descriptions are not intended to be exhaustive or to limit the disclosed invention to the precise form disclosed. Modifications or variations are also possible in light of the above teachings. For example, the chain may be used in connection with a conventional washer to further enhance its cleanliness, and the heater may comprise a radiant heater as well positioned along the return run of the conveyor. As should be appreciated, the sources of energy, whether heat or electricity, may be applied to existing conveyors without significant effort or modification. Indeed, both heat and electrical energy may be provided in order to enhance cleanliness of the conveyor. The embodiments described above were chosen to provide the best application to thereby enable one of ordinary skill in the art to utilize the inventions in various embodiments and with various modifications as are suited to the particular use contemplated. All such modifications and variations are within the scope of the invention.

The invention claimed is:

1. An apparatus for conveying objects, comprising:
   a conveyor for conveying the objects, said conveyor including a plurality of modular links interconnected by a connector rod including an exposed surface; and
   an inductive heater for transmitting energy to the exposed surface at a level sufficient to kill a living organism in contact with the exposed surface.

2. The apparatus of claim 1, wherein the connector rod comprises a metal rod.

3. The apparatus of claim 1, wherein the connector rod comprises a polymer.

4. A conveyor system, comprising:
   an endless loop conveyor having a forward run and a return run; and
   an inductive coil positioned along only the return run of the conveyor for supplying heat at a level sufficient to kill a living organism on the conveyor.

5. The conveyor system of claim 4, wherein the conveyor comprises a plurality of links interconnected by at least one connector capable of conducting heat.

6. The conveyor system of claim 5, wherein the connector comprises metal.

7. The conveyor system of claim 5, wherein the connector comprises a polymer.

8. An apparatus for conveying objects, comprising:
   an endless loop conveyor comprising a plurality of links forming a conveying surface adapted for conveying the objects, said links interconnected by an at least partially exposed connector rod; and
   a first heater positioned opposite the conveying surface.

9. The apparatus of claim 8, further including a second heater positioned adjacent the conveying surface.

10. The apparatus of claim 8, wherein the first and second heaters sandwich a return run of the conveyor.

11. An apparatus for conveying objects, comprising:
    a conveyor formed of a plurality of modular links interconnected by a connector formed of a conductive material, at least one portion of said connector being covered by at least one of said modular links; and
    a source of energy positioned adjacent or in contact with the conveyor for transmitting the energy to a portion of the connector not covered by the at least one modular link in an amount sufficient to kill a living organism in contact with the connector.

12. The apparatus of claim 11, wherein the source of energy comprises a source of electricity.

13. The apparatus of claim 12, wherein the source of electricity comprises a source of direct current.

14. The apparatus of claim 11, wherein the source of energy comprises a heater.

15. A method of operating a belt or chain conveyor, comprising:
    supplying electrical energy in an amount sufficient to kill a living organism in contact with the belt or chain conveyor.

16. The method of claim 15, wherein the supplying step further comprises supplying electrical energy through a circuit including a conductive connector for interconnecting a plurality of modular links forming a portion of the conveyor.

17. The method of claim 16, further including the step of conveying a food product on a forward run of the conveyor.

18. A method of cleaning a conveyor, comprising:
    providing the conveyor with an exposed surface in contact with a living organism; and
    heating the exposed surface of the conveyor in a heightened amount sufficient to kill the living organism in contact with the exposed surface.

19. A conveyor including a plurality of links, comprising:
    an electrified connector rod for interconnecting the plurality of links.

20. The conveyor of claim 19, wherein the plurality of links are arranged in plurality of rows in a conveying direction.

21. The conveyor of claim 20, wherein a plurality of connector rods are adapted to interconnect the plurality of rows.

22. The conveyor of claim 19, wherein the connector rod is comprised of a conductive material.

23. The conveyor of claim 19, wherein the links are comprised of a plastic.

24. The conveyor of claim 19, wherein the connector rod is electrified at a level sufficient to kill a living organism.

25. An apparatus for conveying objects, comprising:
    a conveyor for conveying the objects, said conveyor including a plurality of modular links interconnected by a connector rod including an exposed surface; and
    a source of direct current for transmitting energy to the exposed surface at a level sufficient to kill a living organism in contact with the exposed surface.

26. An apparatus for conveying objects, comprising:
    a conveyor for conveying the objects, said conveyor including a plurality of modular links interconnected by a connector rod including an exposed surface; and
    an inductive heater, said inductive heater including an inductive coil for transmitting energy to the exposed surface at a level sufficient to kill a living organism in contact with the exposed surface.

27. An apparatus for conveying objects, comprising:
    a conveyor for conveying the objects, said conveyor including a plurality of modular links interconnected by a connector rod including an exposed surface; and
    an electrical energy source for transmitting energy to the exposed surface at a level sufficient to kill a living organism in contact with the exposed surface, wherein the source of electrical energy forms a circuit with the connector.

28. A conveyor system, comprising:
    an endless loop conveyor having a forward run and a return run; and
    an inductive heater positioned along only the return run of the conveyor for supplying heat at a level sufficient to kill a living organism on the conveyor;
    wherein the inductive heater comprises a first inductive heater positioned adjacent a conveying surface of the conveyor, and further including a second inductive heater positioned adjacent a surface of the conveyor opposite the conveying surface.

* * * * *